United States Patent [19]

Colley et al.

[11] Patent Number: 5,552,794

[45] Date of Patent: Sep. 3, 1996

[54] POSITION ESTIMATION USING SATELLITE RANGE RATE MEASUREMENTS

[75] Inventors: Jaime B. Colley, Laguna Niguel, Calif.; Thomas A. Niemi, DeWitt, Iowa

[73] Assignee: Rockwell International Corporation, Seal Beach, Calif.

[21] Appl. No.: 235,845

[22] Filed: Apr. 29, 1994

[51] Int. Cl.⁶ .................................................. G01S 5/02
[52] U.S. Cl. ............................................ 342/357; 342/352
[58] Field of Search ................................... 342/352, 357; 364/458, 459

[56] References Cited

U.S. PATENT DOCUMENTS

| | | | |
|---|---|---|---|
| 3,430,234 | 2/1969 | Wright | 343/6 |
| 4,599,620 | 7/1986 | Evans | 343/357 |
| 4,918,609 | 4/1990 | Yamawaki | 364/445 |
| 5,105,198 | 4/1992 | Inamiya | 342/457 |
| 5,148,179 | 9/1992 | Allison | 342/357 |
| 5,202,829 | 4/1993 | Geier | 364/449 |
| 5,359,521 | 10/1994 | Kyrtsos et al. | 364/449 |

*Primary Examiner*—Theodore M. Blum
*Assistant Examiner*—Dao L. Phan
*Attorney, Agent, or Firm*—George A. Montanye; David J. Arthur; Susie H. Oh

[57] ABSTRACT

A method for using a value of range rate observed by a receiver, such as a GPS receiver, to determine the coordinates of points on the surface of the earth from which this value of range rate would be observed. These coordinates are given in an earth-centered, earth-fixed (ECEF) coordinate system, and they form a locus of points of equal range rate. The coordinates of these points provide general estimates of the location of the receiver. By calculating multiple loci of points which intersect each other, a more precise determination of the location of the receiver may be made.

17 Claims, 10 Drawing Sheets

5,552,794

POSITION ESTIMATION USING SATELLITE RANGE RATE MEASUREMENTS

BACKGROUND OF THE INVENTION

1. Field of the Invention

This invention relates to navigation using a global positioning system (GPS) radio receiver which receives information from earth-orbiting satellites. The invention is particularly applicable to making an initial estimate of the position of the receiver by using satellite tracking data and range rate measurements specific to each acquired satellite, and determining the intersections of the lines having constant range rate values.

2. Description of the Related Art

Embodiments of the present invention may include the process by which a GPS receiver acquires signals transmitted by a constellation of satellites orbiting the earth, and accordingly makes an estimation of the initial receiver position from which to navigate. At any given location on the earth, however, the receiver can only receive signals from those satellites which are visible at that location. Because the satellite signals generally have a low signal-to-noise ratio, acquisition of particular satellites can be improved if the visible satellites which are transmitting signals can be determined.

Typically, GPS receivers are capable of determining which unobscured satellites are transmitting signals by evaluating the signal outputs relative to the location of the receiver itself. However, the receiver often cannot approximate its own location, and thus cannot make a determination of visible satellites based upon a Known location.

The process of detecting signals from visible satellites requires the detection of signals from at least one satellite. The identity of the particular satellite is then determined according to its transmitted information (associated with a pseudo-random code) to select which of the other satellites transmissions to search for next. This process is continued until transmissions are received from the minimum number of GPS satellites necessary for navigation. Four satellites are generally required for three-dimensional tracking.

However, acquiring the necessary satellite signals from a cold start, i.e., when the receiver location and/or time are unknown, is a relatively time consuming process. Accordingly, there is a substantial commercial advantage in reliably performing this acquisition with significantly increased speed. One approach used to improve satellite signal acquisition is to acquire a first signal, then make an initial estimate of the region of the earth in which the receiver is located by calculating a "pseudo range" from the satellite. The pseudo range describes the measurement of range from the receiver to the satellites using an imprecise clock. The pseudo range, however, is an inexact range value due to a bias of fixed magnitude in each range estimate attributable to the clock bias error and clock drift.

The receiver clock bias can significantly affect the resultant range values since the distances, and thus the time lag, between the receiver and the satellites are extremely large. Consequently, the clock bias error magnifies the error in the measured range values. The clock drift error is generally indicated in terms of oscillator frequency. The rate at which the oscillator vibrates corresponds to the frequency, and is thus related to the satellite velocity. Ideally, the clock drift value is assumed to be zero. However, the clock drift error is substantially affected by and varies with temperature. As a result, as soon as the GPS receiver is activated, clock drift or bias error may be expected. Accordingly, it may be important to correct for errors attributable to the clock bias.

In conventional GPS schemes, the receiver searches for signals from satellites known to be visible from the initially-estimated region of probable location. Upon acquisition of another signal, another calculation of pseudo range is made to define a narrower region of location of the receiver, and so on. As the region of location grows smaller, the probability of finding additional satellite signals should improve. As mentioned above, however, the pseudo range approach has an inherent drawback. The calculated value of pseudo range is affected by the above-described bias in the internal clock of the GPS receiver. If the bias is large, the estimated region of location of the receiver may be unreasonably large, and would be correspondingly uncertain. Such a result would be of diminished value.

SUMMARY OF THE INVENTION

The present invention relates to a method and apparatus for estimating the location of a position on the earth where the range rate and doppler value of the satellite signals are constant. Embodiments of the present invention allow an initial navigation position to be estimated by a GPS receiver using satellite tracking data and range rate measurements exclusively.

More particularly, in accordance with embodiments of the invention, there is provided a method for using a value of a satellite's range rate observed by a receiver at a particular location to determine the coordinates of points on the surface of the earth from which this value of range rate would be observed. These coordinates are given in an earth-centered, earth-fixed (ECEF) coordinate system, and they form a locus of points of equal range rate. They are also points of equal doppler value, and thus define a curve called an "isodop" line.

The coordinates of points on the isodop line provide estimates of the location of the receiver. This may be an initial estimate in the process of acquiring the satellite signals necessary for navigation. When a second satellite signal and a second isodop line are found, a localized estimate of the receiver location can be made according to the intersection of the two lines. If the two isodop lines do not intersect, it is assumed that the clock drift has been estimated incorrectly. To correct for the clock error, the estimated drift value of the receiver's internal clock is iteratively varied until an accurate intersection of the isodop lines can be found. The intersection point represents the hypothetical position of the receiver. The search for further satellites is then resumed based upon this hypothetical position.

Accordingly, embodiments of the present invention provide a determination of GPS receiver position as an alternative to range-based navigation. The invention has the advantages that the position estimate provided has less uncertainty attributable to receiver clock drift than a pseudo range estimate, and is not particularly vulnerable to initial assumptions. In addition, the time required by a receiver to acquire all of the necessary initial satellite signals, that is, the "time to first fix," is significantly reduced.

DESCRIPTION OF THE PREFERRED EMBODIMENT

Figure 1:
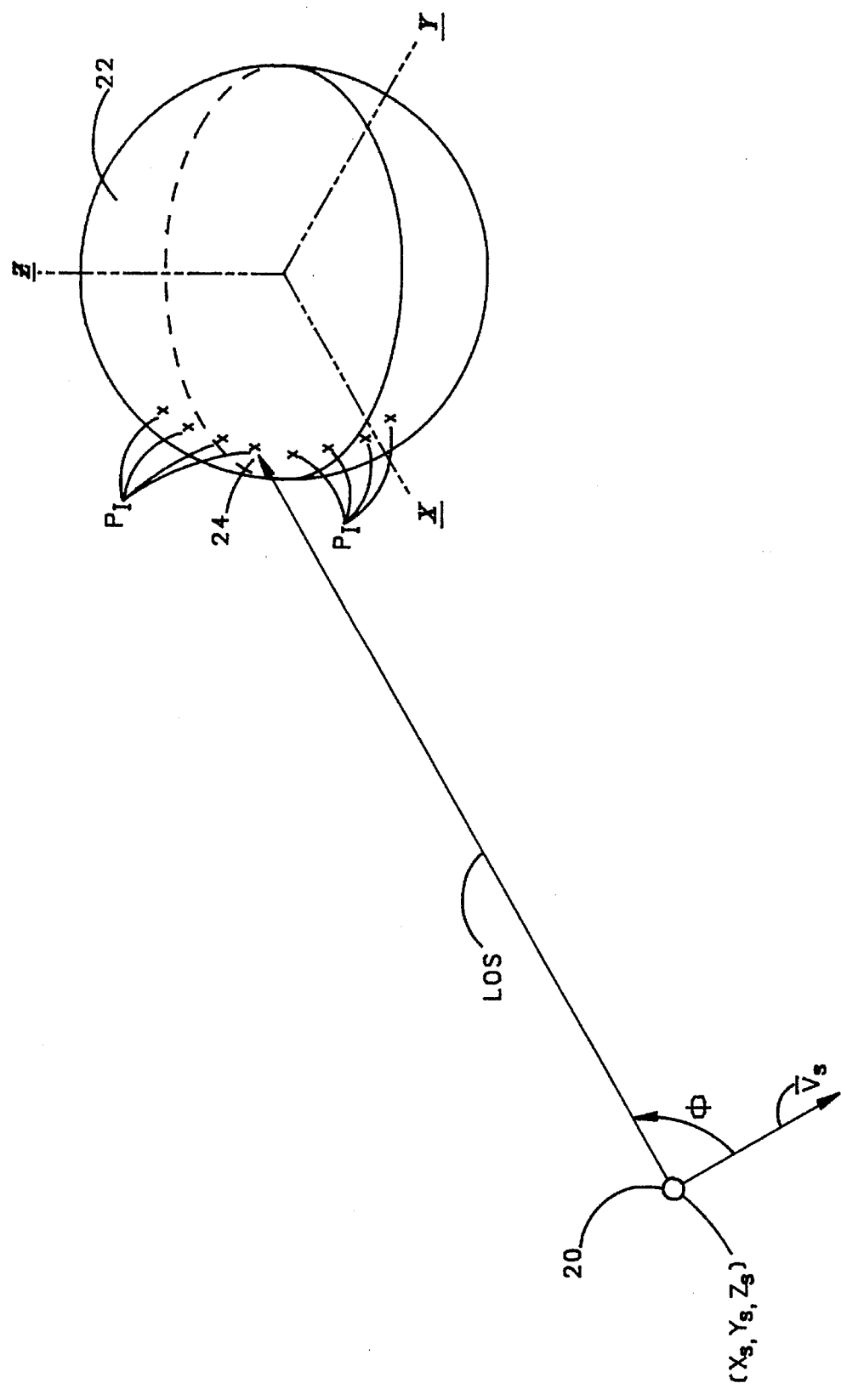
FIG. 1 is a perspective view of a satellite orbiting the earth, relative to points on an isodop line.

In accordance with embodiments of the present invention, it has been found that the rate of change of the range, i.e., the "range rate," from a satellite to a receiver is useful in estimating a region of location of the receiver. Because a computed value of the range rate is less affected by clock drift than is pseudo range, the resultant geometric constraints limit the possible values for the range rate. By determining the locations on the surface of the earth which correspond to the satellite range rate value calculated by the receiver, these locations provide estimates of the general location of the receiver and may be used to determine which satellite signals to search for next.

As discussed in more detail below, in embodiments of the invention, there is established a satellite frame of reference, which may consist of orthogonal axes aligned with the satellite velocity vector and the gravity vector at the satellite. A third axis may be orthogonal to these other axes. Similarly, an earth-centered, earth-fixed (ECEF) coordinate system describes the translation of coordinates of the origin of the satellite velocity vector representing the satellite's position relative to the earth. It will be recognized that other coordinate systems and axis arrangements may be implemented using translated or otherwise modified equations, described below.

An observed range rate enables computation of the angle between the satellite velocity vector and a line-of-sight from the satellite to the particular location of the receiver. The line-of-sight from the satellite to each point on the line on the earth's surface along which the satellite's range rate is constant, i.e., the isodop line, forms the same angle with the satellite velocity.

Using geometry, the lengths of a number of these lines-of-sight to points on the isodop line can be calculated along with their orientations in the satellite frame of reference. The latter orientations are used in combination with the vector orientation of the satellite frame of reference in the ECEF coordinate system to determine the vector components of the lines-of-sight in the ECEF coordinate system. Starting from the ECEF position of the satellite, which is known as a part of the information received from the satellite, the ECEF line-of-sight vectors from the satellite are used to provide the ECEF location of the points on the isodop line. The resultant locus of points describes the possible initial locations of the receiver.

Thus, embodiments of the invention provide a precise determination of the location of the GPS receiver by enabling fast and accurate estimation of the user's location relative to a GPS satellite. Embodiments of the present invention overcome calculation uncertainty due to errors in measured clock time or satellite position, or both. Corrections for the estimated clock drift and the resultant variations in the range rate measurements provide for multiple intersecting isodop lines which, in turn, provide an accurate determination of the initial receiver location.

Determination of a First Isodop Line

As illustrated in FIG. 1, a GPS satellite 20 orbits the earth 22, modeled in connection with the invention as a sphere. A GPS receiver (not shown) at a particular location 24 on the surface of the earth has acquired the signal from the satellite. The satellite transmits information called an "almanac" that includes the position coordinates $(X_S, Y_S, Z_S)$ of the satellite in an earth-centered, earth-fixed (ECEF) coordinate system, illustrated in the figure with three orthogonal axes labeled x, y, and z. From the almanac received from the one or more satellites, the receiver computes not only the position coordinates, but also the components $(V_{Sx}, V_{Sy}, V_{Sz})$ of the satellite velocity vector $v_S$, in the ECEF coordinate system.

The line-of-sight from the satellite 20 to the particular receiver location 24 is shown as a vector LOS. The line-of-sight has a length L, which represents the range of the satellite to the receiver. From received satellite signals, the receiver can determine the rate of change of the range. This will be referred to herein as observing the range rate, represented by the variable I. When a receiver at a location 24 observes a particular value for I, embodiments of the invention determine the coordinates $P_{Ix}$, $P_{Iy}$, $P_{Iz}$ (in the ECEF coordinate system) of points $P_I$ from which there would be observed this same value of range rate I. The receiver can then approximate its location along the isodop line formed by the points $P_I$, thus leading to faster and more accurate subsequent satellite acquisition.

Figure 2:
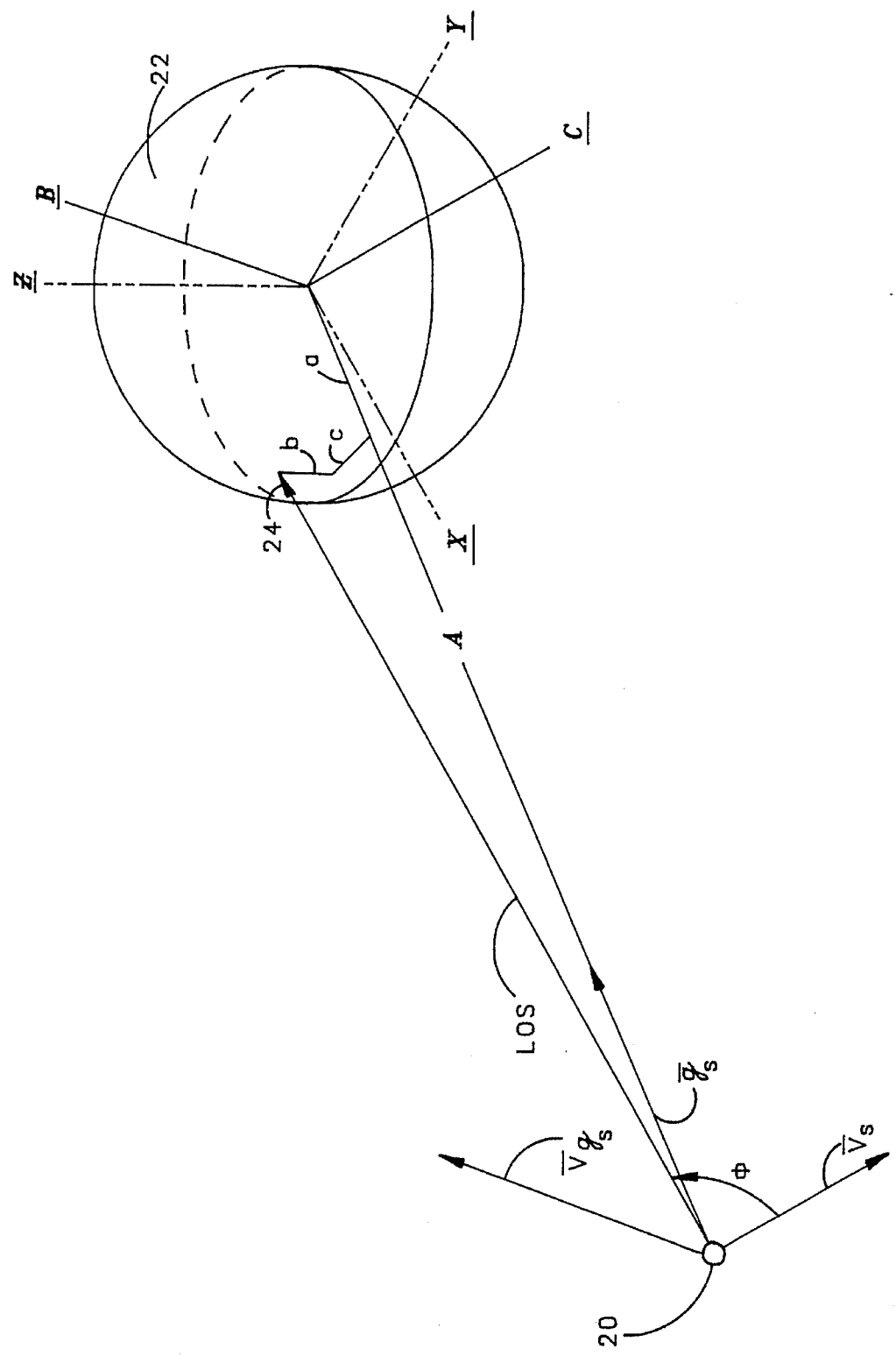
FIG. 2 is a perspective view of the relationship between a satellite frame of reference and an earth-centered, earth-fixed (ECEF) coordinate system.

FIG. 2 illustrates initial steps in the determination made by embodiments of the present invention. Several orthogonal vectors are defined with their origins at the satellite 20. A gravitational vector $g_S$ is directed from the center of mass of the satellite to that of the spherical earth. The satellite velocity vector $V_S$ is assumed to be perpendicular to the gravitational vector. A third vector $V_{g_s}$ is defined as the vector product $V_{g_s} = V_S \times g_S$. The three orthogonal vectors $V_S$, $g_S$ and $V_{g_s}$ form a coordinate system having its origin at the satellite; this system is referred to in this application as the satellite frame of reference.

Another coordinate system, with axes A, B and C, is earth-centered. The A axis is colinear with and opposite in direction to the gravitational vector $g_S$; the B axis is parallel to $V_{g_s}$; and the C axis is parallel to the velocity vector $v_S$. In this coordinate system, the coordinates of receiver location 24 are (a, b, c). As illustrated in FIG. 2, the A, B, C coordinate system is not earth-fixed like the x, y, z system, but rotates about the earth's center as the satellite moves.

To locate the satellite position 20 relative to the receiver location 24, the approximate location of the receiver must first be determined. According to embodiments of the present invention, by calculating the rate of change I of satellite range, a number of points on an isodop line can be generated. As explained above, an isodop is a line on the surface of the earth where the value of the satellite range rate is constant and all of the points on the isodop line have equal doppler value.

As explained above, the satellite range rate is defined by the rate of change of range of the satellite relative to the receiver as the satellite orbits the earth. The range rate is determined by, and thus represents, the frequency shift of the orbiting satellite's signals. Consequently, the range rate and doppler value are the same. The range rate observed by a receiver at a particular location, in addition to either satellite almanac or ephemeris parameters, are used to determine the coordinates of points on the surface of the earth from which the particular value of range rate would be observed. The coordinates form a locus of points of equal range rate and thus provide estimates of the location of the GPS receiver. If further satellite signals and isodop lines are found, the intersection of the lines provides a localized estimate of the receiver location.

The doppler measurements represent the stretching or contracting of transitions between bits in the signal data stream transmitted by the satellite. The range rate along the isodop is thus a function of the satellite's velocity vector and the receiver's orientation to the velocity vector. The range rate I is given by the relationship $I=-|V_S|\cos\phi$, where $\phi$ is the angle between the line-of-sight LOS and the velocity vector $V_S$. Thus, the range rate is the component of the satellite velocity along the line-of-sight.

Referring to FIG. 1, it can be understood that for each of the points $P_I$, the line-of-sight from the satellite forms the same angle $\phi$ with the satellite velocity vector $V_S$. In the problem to be solved, we can use the observed value of I and received values of $(V_{Sx}, V_{Sy}, V_{Sz})$ to compute $$\cos\phi = \frac{-I}{|V_S|} \quad \text{[equation 1]}$$

Figure 3:
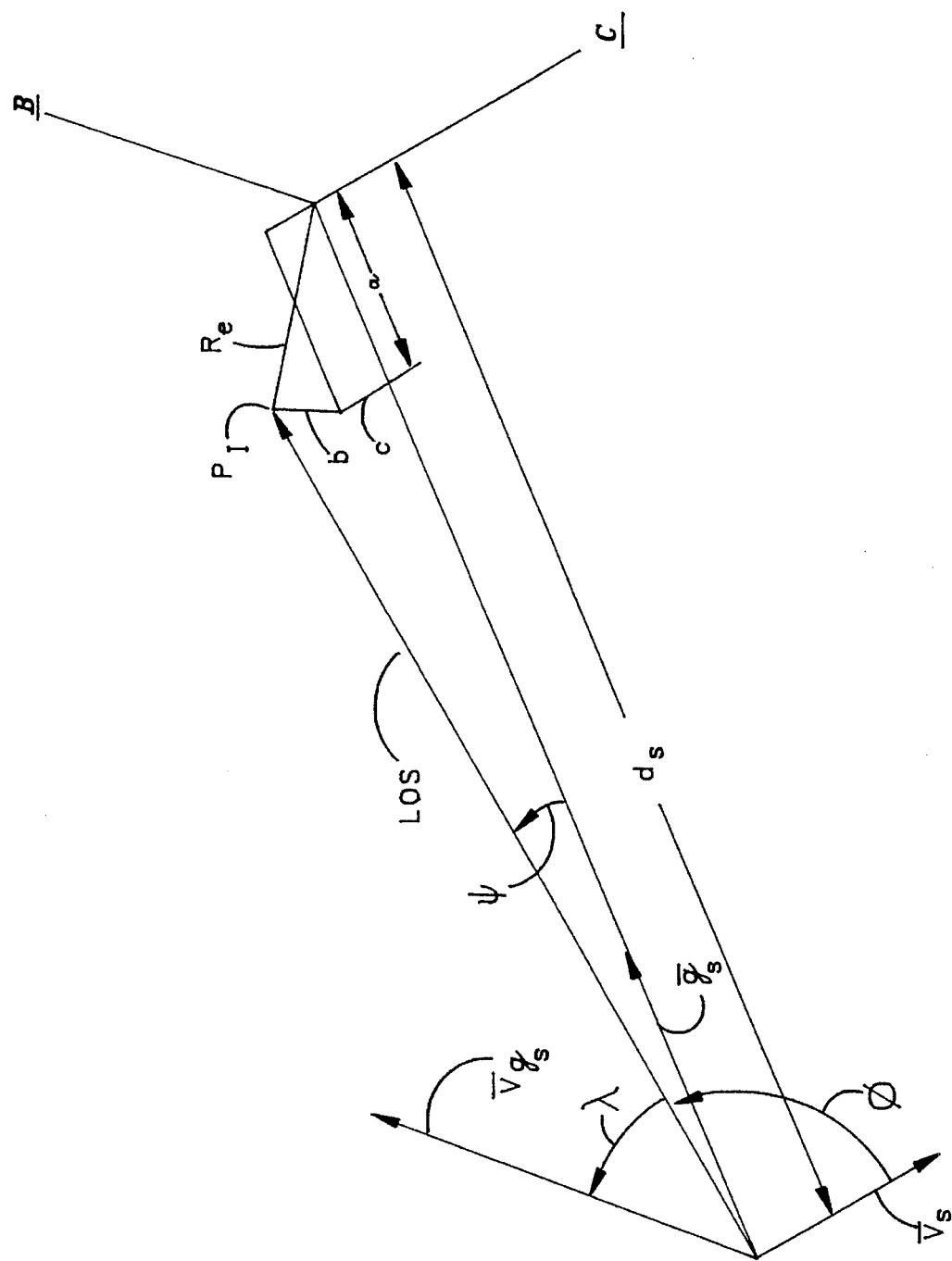
FIG. 3 is a perspective view of the geometric relationships between a satellite and earth points used in computations according to an embodiment of the invention.

Considering FIG. 3, there are observed additional relationships. From the position coordinates $(X_S, Y_S, Z_S)$ (FIG. 1) of the satellite, there is readily calculated the distance $d_S$ of the satellite from the center of the earth, by $$d_s = \sqrt{X_s^2 + Y_s^2 + Z_s^2} \ .$$

The cosine of the angle $\psi$ between the line-of-sight vector LOS and the gravitational vector $g_S$ is given by $$\cos\psi = \frac{d_s - a}{L} \quad \text{[equation 2]}$$

The value a equals the distance from the center of the earth, i.e., the origin of its coordinate system, to a point on the cartesian coordinate system A, B, C. This coordinate system is used as the fixed reference for a generic sphere of radius $R_e$ (as shown In FIG. 3) such that $a^2+b^2+c^2=R_e^2$. Accordingly, the cosine of the angle between LOS and $V_{g_s}$ is given by $$\cos\lambda = b/L \quad [3].$$

The length L of the line-of-sight LOS is given by $$L = \sqrt{(d_s - a)^2 + b^2 + c^2} \ . \quad \text{[equation 4]}$$

As noted above, the radius of the spherical model earth 22 is $R_e$. Since $$R_e^2 = a^2 + b^2 + c^2 \quad [5],$$

then $$c_e^2 = R^2 - a^2 - b^2.$$

Substituting the latter into equation 4 yields $$L = \sqrt{(d_s^2 - 2ad_s + a^2) + b^2 + (R_e^2 - a^2 - b^2)} \ ,$$

which simplifies to $$L = \sqrt{d_s^2 - 2ad_s + R_e^2} \ . \quad \text{[equation 6]}$$

Figure 4:
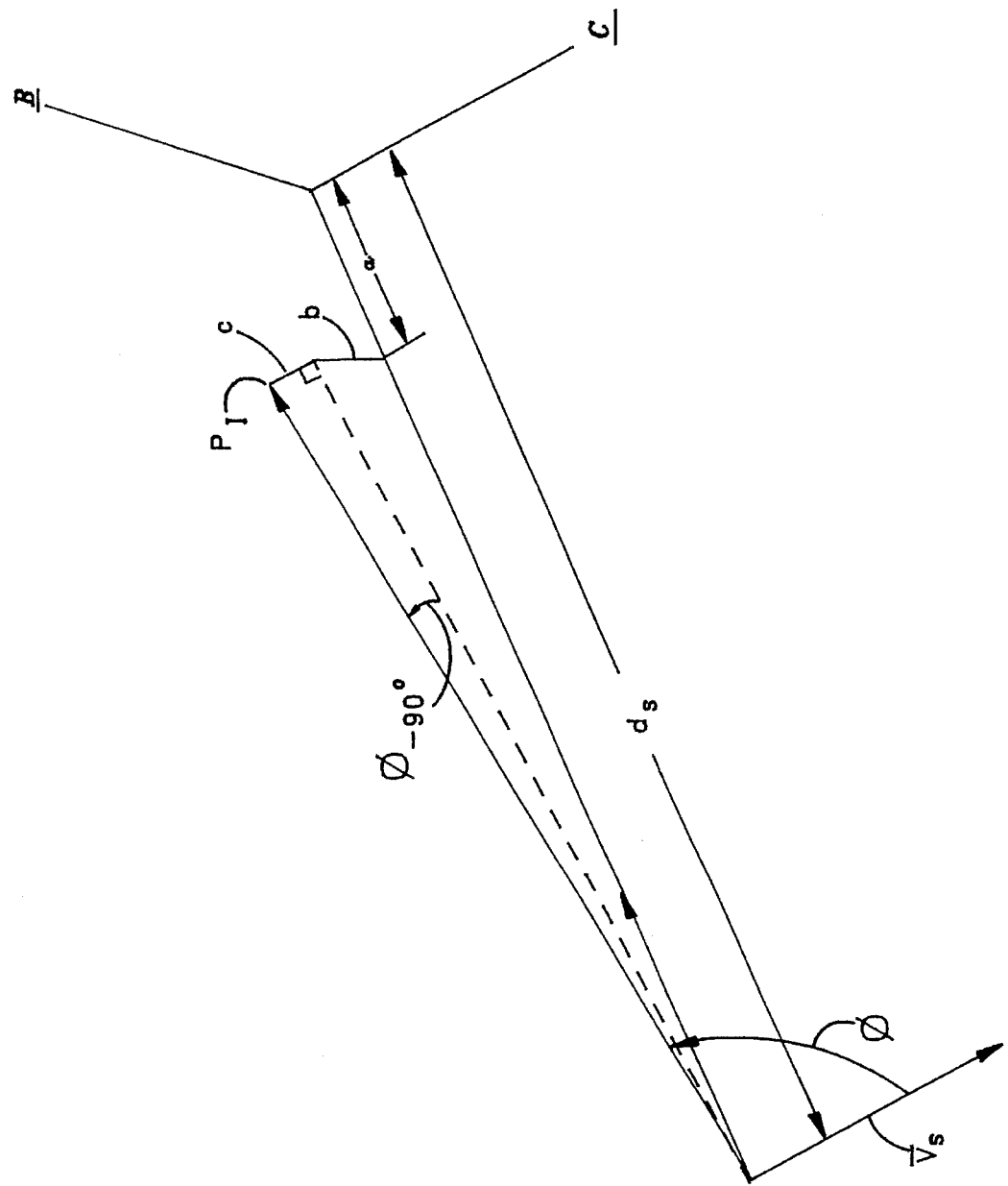
FIG. 4 is a perspective view of other aspects of the geometric relationships of FIG. 3.

FIG. 4 illustrates somewhat different aspects of the geometric relationships of FIG. 3. From FIG. 4 it can be seen that tan $$\phi = \frac{c}{\sqrt{(d_s - a)^2 + b^2}} \ .$$

Accordingly, $$c^2 = \frac{(d_s - a)^2 + b^2}{\tan^2\phi} \ .$$

Substituting the latter into equation 5 yields $$R_e^2 = a^2 + b^2 + \frac{(d_s - a)^2 + b^2}{\tan^2\phi}$$

which, through algebraic and trigonometric manipulation, becomes $$b = \sqrt{R_e^2 \sin^2\phi - a^2 + (2ad_s - d_s^2)\cos^2\phi} \ . \quad \text{[equation 7]}$$

The preceding description has developed several equations for variables in the satellite frame of reference and the corresponding A, B, C coordinate system. The above equations will now be applied to determine the solution vector L (satellite range) referenced to a generalized satellite frame. The points on the isodop line can then be determined by extending outward a certain distance from the satellite position, oriented at angles $\phi$, $\lambda$ and $\psi$, with respect to the generalized satellite coordinate system.

The following development describes transformations that relate variables in the satellite frame of reference and the A, B, C coordinate systems to the ECEF coordinate system. It should be noted that a significant characteristic of the above equations is that the satellite reference frame can be translated to another location without altering the relationship between the solution vector and the reference frame since the equations are generated according to a sphere of constant radius. Thus, the relationship does not change as long as (1) the distance between the center of the reference frame and the center of the sphere is constant, and (2) the satellite gravity axis points toward the center of the sphere.

With respect to the ECEF coordinate system, the components $(e_{Vx}, e_{Vy}, e_{Vz})$ of the unit vector $e_V$ of $V_S$ are, by definition, $$e_{Vx} = \frac{V_{Sx}}{|V_S|} \qquad e_{Vy} = \frac{V_{Sy}}{|V_S|} \qquad e_{Vz} = \frac{V_{Sz}}{|V_S|} \ . \quad \text{[equations 8]}$$

Similarly the components $(e_{gx}, e_{gy}, e_{gz})$ of the unit vector $e_g$ of the gravitational vector $g_S$, with respect to the ECEF system, are given by the relationships $$e_{gx} = -\frac{X_S}{d_s} \quad e_{gy} = -\frac{Y_S}{d_s} \quad e_{gz} = -\frac{Z_S}{d_s} \ . \qquad \text{[equations 9]}$$

The unit vector $e_{Vg}$ of $V_{g_S}$ is given by $e_{Vg} = e_v \times e_g$. Vector multiplication of equations 8 and 9 provides the components $(e_{Vgx}, e_{Vgy}, e_{Vgz})$ of $e_{Vg}$, with respect to the ECEF coordinate system as $$e_{Vgx} = e_{Vy} e_{gz} - e_{Vz} e_{gy} \quad e_{Vgy} = e_{Vz} e_{gx} - e_{Vx} e_{gz} \quad e_{Vgz} = e_{Vx} e_{gy} - e_{Vy} e_{gx} \qquad [10].$$

Thus, with the determination of equations 8, 9, and 10, there is derived the vector orientation of the satellite frame of reference with respect to the ECEF coordinate system.

Another part of the calculation of the coordinates $(P_{Ix}, P_{Iy}, P_{Iz})$ is to determine the orientation of the line-of-sight LOS with respect to the satellite frame of reference. This is expressed in terms of the unit vector $e_L$ of LOS with components $(e_{Lx}, e_{Ly}, e_{Lz})$ in the ECEF system.

By definition, the cosine of the angle between two unit vectors is equal to the dot product of the vectors. Accordingly, $\cos\phi = e_V \cdot e_L$. The solution vectors are related to the satellite reference frame by means of the direction cosines. Expressed in terms of vector components, $\cos\phi = e_{Vx} e_{Lx} + e_{Vy} e_{Ly} + e_{Vz} e_{Lz}$. More generally, $$|\cos \phi||e_{Vx} e_{Vy} e_{Vz}||e_{Lx}||\cos \psi| = |e_{gx} e_{gy} e_{gz}||e_{Ly}||\cos \lambda||e_{Vgx} e_{Vgy} e_{Vgz}||e_{Lz}| \qquad [11].$$

Because the unit vectors of the satellite frame of reference form a basis for the satellite reference system, the inverse of the matrix of the reference system unit vectors in equation 11 is equal to its transpose. Accordingly, with some manipulation of the matrices, $$|e_{Lx}||e_{Vx} e_{gx} e_{Vgx}||\cos \phi||e_{Ly}| = |e_{Vy} e_{gy} e_{Vgy}||\cos \psi|. \ |e_{Lz}||e_{Vz} e_{gz} e_{Vgz}||\cos \lambda|$$

That is, $$e_{Lx} = e_{Vx} \cos \phi + e_{gx} \cos \psi + e_{Vgx} \cos \lambda \quad e_{Ly} = e_{Vy} \cos \phi + e_{gy} \cos \psi + e_{Vgy} \cos \lambda \quad e_{Lz} = e_{Vz} \cos \phi + e_{gz} \cos \psi + e_{Vgz} \cos \lambda \qquad [12].$$

Figure 5:
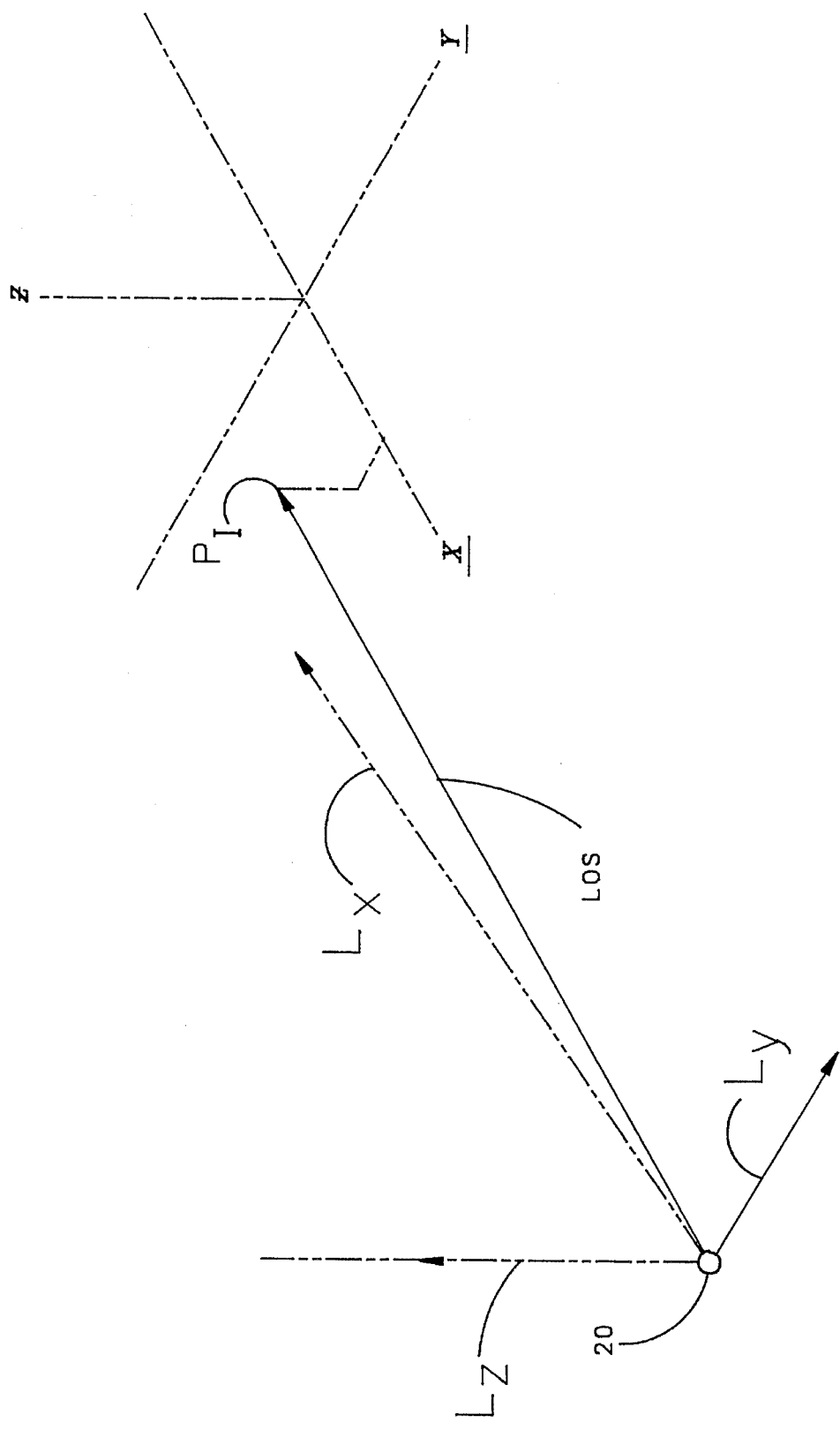
FIG. 5 is a perspective view of the vector components for final determination of isodop points according to embodiments of the present invention.

As can be seen in FIG. 5, the coordinates of the points $P_I$ along the isodop in ECEF terms can be determined from the position of the satellite 20 and the components of the LOS vector which connects the satellite and $P_I$. That is, $$P_{Ix} = X_S + L_x \quad P_{Iy} = Y_S + L_y \quad P_{Iz} = Z_S + L_z \qquad [13].$$

where:

$$L_x = L \cdot e_{Lx} \quad L_y = L \cdot e_{Ly} \quad L_z = L \cdot e_{Lz}$$

Consequently, it will be understood that the location of the isodop points $P_I$ can be generated according to the satellite's range rate, the satellite's position and velocity in terms of ECEF coordinates, the radius of the sphere representing the earth, and a distance from the center of the earth along the gravity axis a. Although the value of the distance along the gravity axis a is variable, the remaining values depend upon various geometric limits.

Determination of Multiple Isodop Lines

Summarizing, in accordance with preferred embodiments of the present invention, after at least one satellite has been acquired during initial acquisition, the satellite's position and velocity are determined. Based upon the position and velocity values, the range rate of the acquired satellite is measured, consequently enabling the determination of the corresponding isodop line. However, as described in more detail below, the measured range rate is not necessarily the same as the true range rate which is affected by clock drift error inherent in the receiver clock.

As explained above, the isodop line is a line on the surface of the earth along which the satellite's range rate and doppler measurement are constant. Accordingly, by placing the user's hypothetical position on various points along the isodop, other satellites that may be visible from the isodop points may be acquired. Each time a new satellite is acquired or, if during initial acquisition, multiple satellites have been acquired, each additional satellite's isodop line is determined. If the isodop lines associated with each satellite intersect, the user's hypothetical position may be accurately placed on that intersection point.

Embodiments of the present invention, however, contemplate that there may be instances when the isodop lines do not intersect. It is believed that this lack of intersecting isodops is attributable to error in the estimated clock drift error. This clock drift error may be initially estimated according to the type and quality of clock used. Ideally, the clock drift is zero. For some of the world's best and consequently most expensive clocks available, the drift error may be extremely small. However, it is generally recognized that most commonly-available and affordable clocks have an inherent constant clock drift which may be specified by the manufacturer or other standards organization, or may be determined by trial-and-error methods.

Thus, if the multiple isodop lines corresponding to the multiple acquired satellites do not intersect, the estimated clock drift of the GPS receiver is adjusted to represent a new isodop line. The clock drift value is consequently iteratively varied until an intersection of the isodop lines is obtained. Accordingly, the user's hypothetical position may be determined to be located at the one or more intersecting points. The search for additional satellites may then be resumed from the hypothetical position.

If multiple intersections are produced, the search for additional satellites will be made from each intersecting point until another intersecting satellite isodop line is generated. After the desired number of satellites has been acquired, and their isodop lines determined and superimposed, an accurate estimate of the initial GPS user position can be determined using almost exclusively satellite tracking data and range rate measurements when no other information relating to the user's location, time, or both are available.

Practical Sequence of Steps

Because embodiments of the invention are intended to be carried out in real time in a commercial device, the sequence of steps can be arranged to be more practical than the order in which the equations have been developed above. The following represents a preferred embodiment:

(1) Determine, in either order, the components $(e_{Vx}, e_{Vy}, e_{Vz})$ according to equations 8, and the components $(e_{gx}, e_{gy}, e_{gz})$ according to equations 9.

(2) Use the values $(e_{Vx}, e_{Vy}, e_{Vz})$ and $(e_{gx}, e_{gy}, e_{gz})$ to determine the components $(e_{Vgx}, e_{Vgy}, e_{Vgz})$ according to equations 10. At this point, with the determination of the components of $e_V$, $e_g$, and $e_{Vg}$, the orientation of the satellite frame of reference with respect to the ECEF coordinate system has been determined.

(3) Before or after the above steps, determine cos φ according to equation 1, using the observed value of range rate.

The above steps compute values that do not change among the various points $P_I$. The next sequence of steps is performed for each different $P_I$. One of the variables related to the location of the point $P_I$, such as a, b, c or LOS in FIG. 3, is selected to be given different values corresponding to different locations of the points $P_I$. In the approach of the equations developed above, the variable a was selected.

(4) The selected variable, a in this example embodiment, is given one of a set of values. The range of meaningful values for a can be computed from the geometry of the situation.

(5) Determine the length L of a specific LOS corresponding to the selected value of a, according to equation 6.

(6) Determine the orientation of the specific LOS with respect to the satellite frame of reference, using equations 2, 7 and 3 to determine functions of angles ψ and λ, along with that already determined for angle φ.

(7) Determine the components of the specific LOS with respect to the ECEF coordinate system, using equations 12 and 14.

(8) Determine the location coordinates $(P_{Ix}, P_{Iy}, P_{Iz})$ with respect to the ECEF system using equations 13 or 15. The values of $P_{Ix}, P_{Iy}, P_{Iz}$ determined in this way describe a locus of points from which would be observed a particular value of range rate I. This isodop line provides an estimate of the location of the GPS receiver. Other isodop lines from other satellites can be used to refine this estimate.

(9) The steps beginning with giving a value to a are repeated for any remaining values of a, for which $P_I$ is to be computed.

Steps For Obtaining Isodop Intersections

Figure 6:
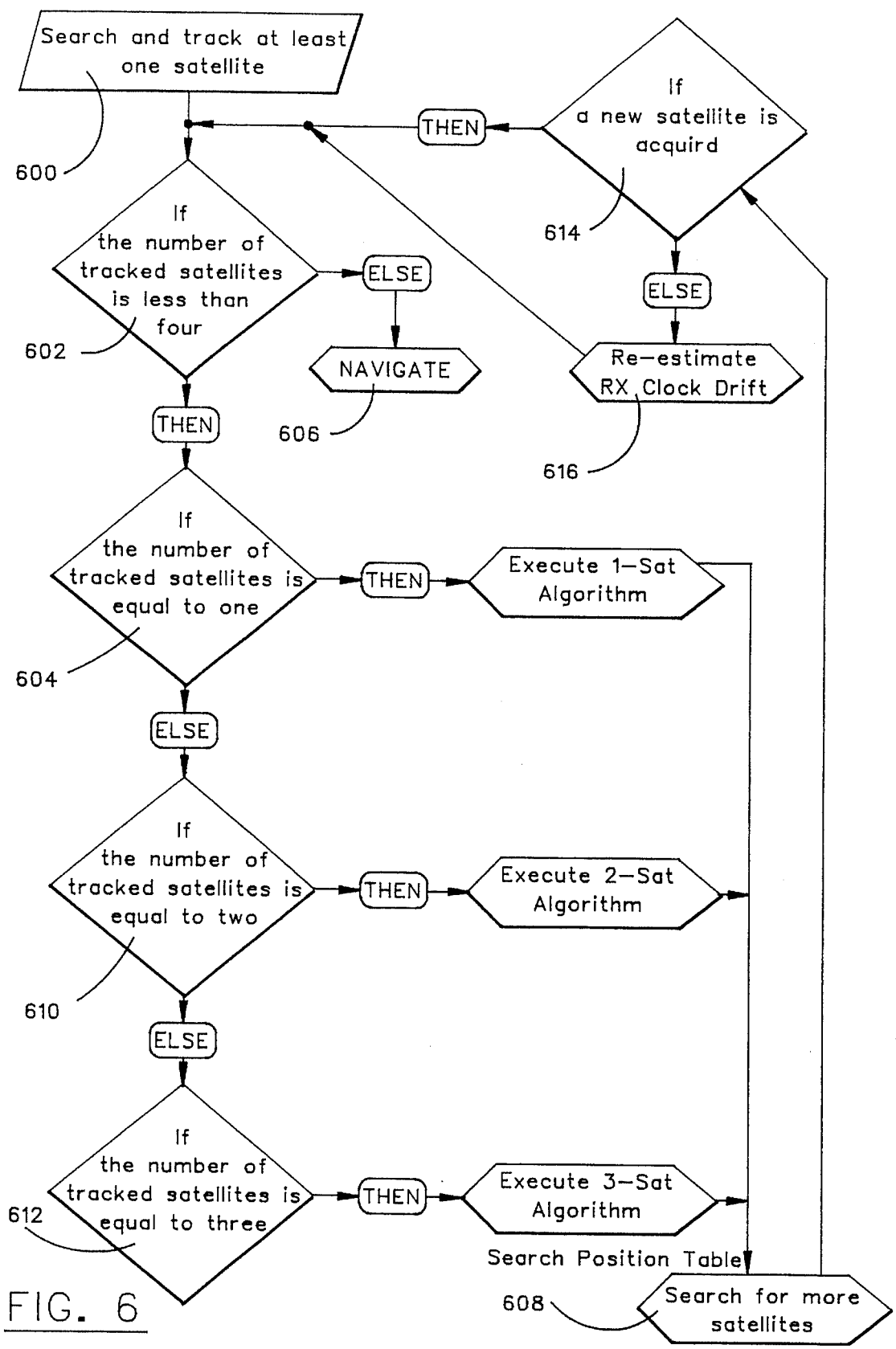
FIG. 6 is a flow diagram of an isodop-based positioning system.

With regard to the determination of an intersection of multiple superimposed isodop lines, FIG. 6 describes a method according to an embodiment of the present Invention for determining the GPS user's, and thus the receiver's, Initial location as represented by the point of isodop intersection. In step 600, an initial search to track a first satellite is made. If the total number of tracked satellites is fewer than four (step 602), the calculations continue to step 604. If four or more satellites are tracked, thus providing sufficient satellite data for immediate three-dimensional tracking, GPS navigation may begin (step 606). Once the GPS tracking system is activated, and if only one satellite is acquired initially (step 608), a separate one-satellite formula will be implemented according to embodiments of the present invention.

Figure 7:
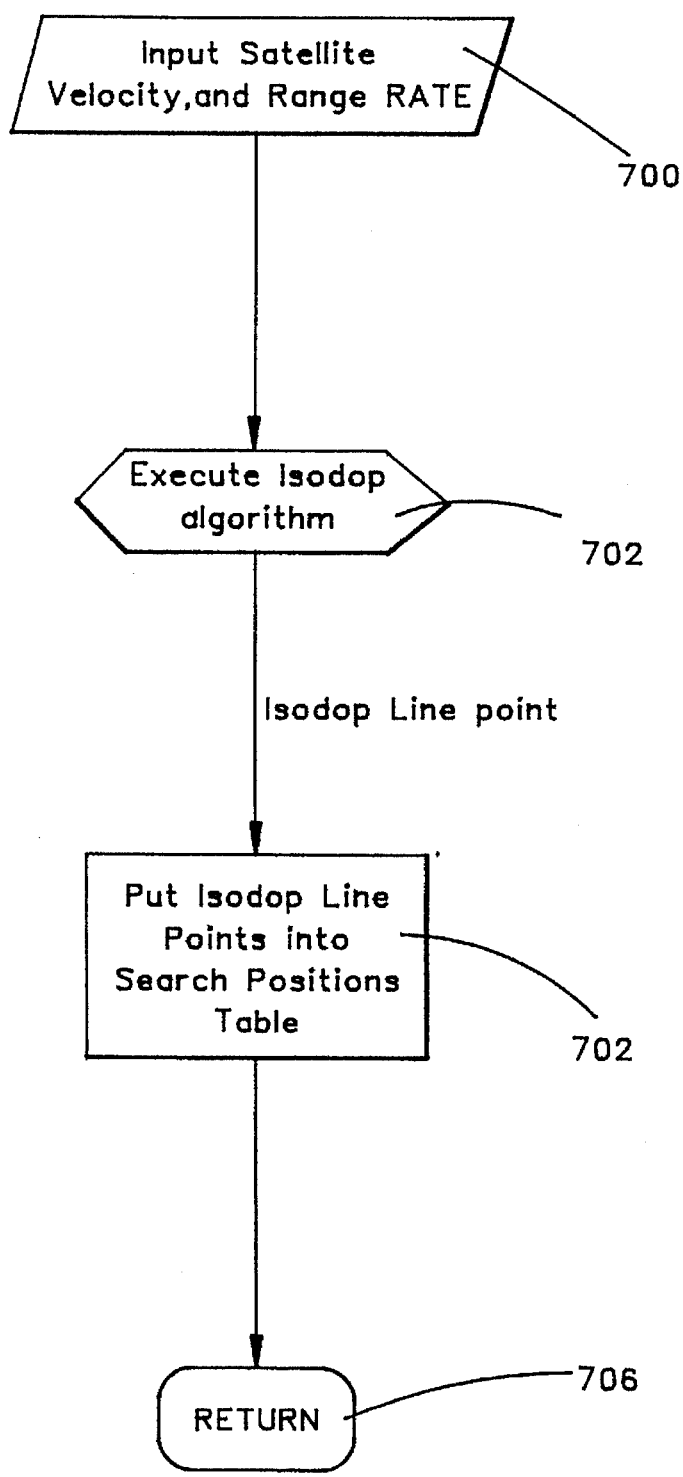
FIG. 7 is a flow diagram of a one-satellite acquisition system for incorporation in the flow diagram of FIG. 6.

Referring to FIG. 7, the one-satellite inquiry considers the satellite position, velocity, and range rate, as determined according to the characteristics of the received satellite signals (step 700). Upon entering the satellite data, the isodop equations described in detail above are executed to determine the points on the isodop line corresponding to the particular satellite (step 702). The isodop line coordinates may then be mapped or drawn out, or otherwise indicated in a search positions table which describes the isodop coordinates (step 704). After the first isodop line has been plotted, the inquiry returns (step 706) to the main positioning routine shown In FIG. 6.

Following the execution of the one-satellite algorithm, embodiments of the present invention continue to search for additional satellites (step 608). If one or more additional satellites are acquired (step 614), the tracking inquiry is repeated at step 602. According to embodiments of the invention, if two or three satellites are tracked, steps 610 and 612 are executed. If additional satellites are not acquired, however, the estimated clock drift is adjusted (step 616). The iteratively varied clock drift is incorporated into the satellite tracking data, and steps 610 and 612 may be performed. The revised clock drift value is incorporated into the range rate equation:

$$I_t = I_m - \text{clock drift} \qquad [14],$$

where $I_t$ equals the true range rate which has been corrected for clock drift error, and $I_m$ equals the measured range rate.

If the initial clock drift error is estimated to be very small, further searching may not produce another satellite having an isodop line that intersects with that of the first. Thus, according to preferred embodiments of the invention, if additional satellites are not found, the clock drift value is iteratively adjusted until a new isodop line which intersects with the initial line is found. For example, if the initial clock drift estimate is 0 m/s, a revised value may be 10 m/s or 50 m/s, depending upon the relative effect of the clock drift value on the measured range rate value. The general purpose of the iterative re-estimation of the clock drift is to accurately determine the actual clock drift as represented by intersecting isodop lines.

Figure 8:
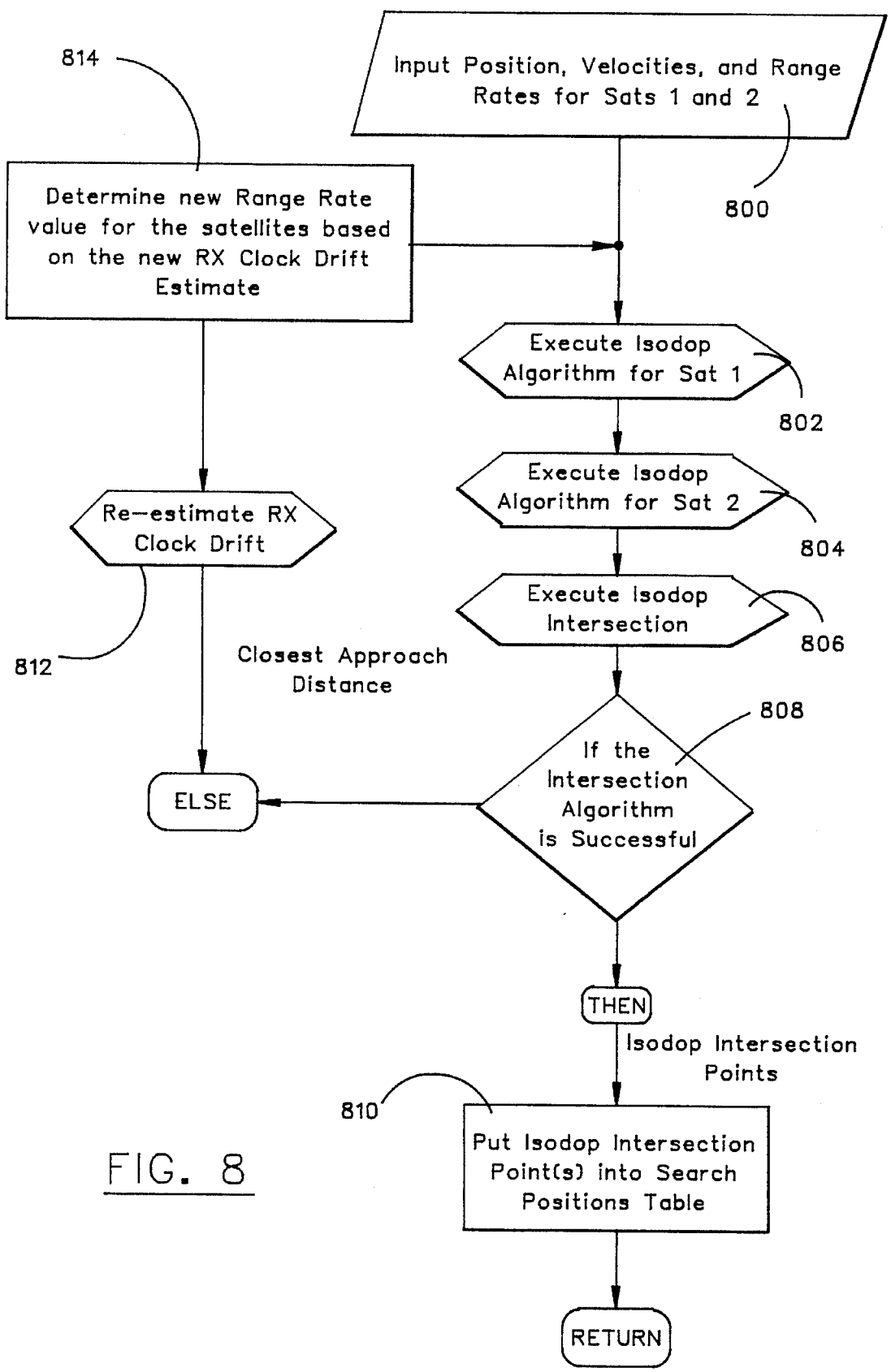
FIG. 8 is a flow diagram of a two-satellite acquisition system for incorporation in the flow diagram of FIG. 6.
Figure 9A:
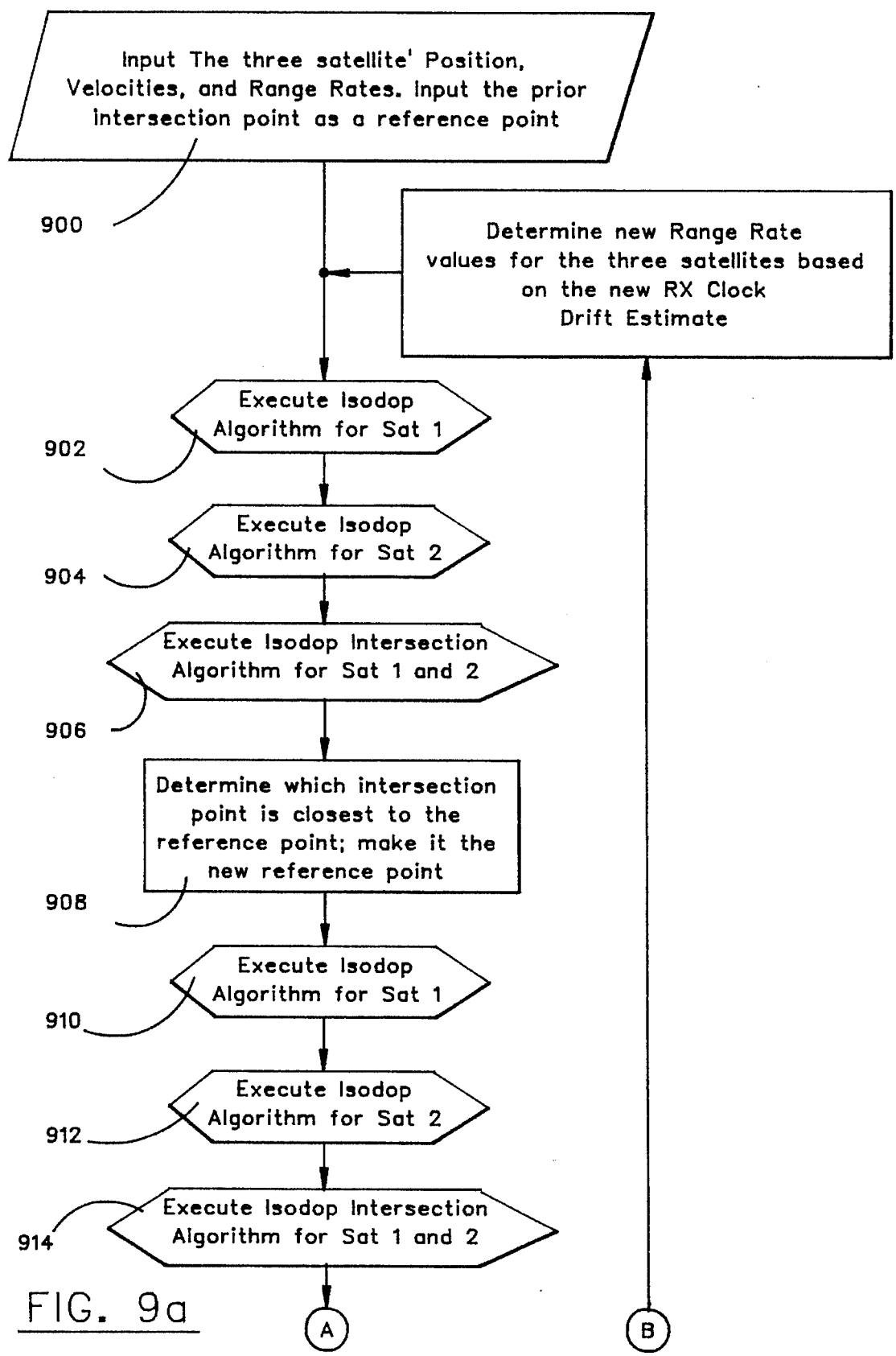
FIGS. 9a and 9b are flow diagrams of a three-satellite acquisition system for incorporation in the flow diagram of FIG. 6.
Figure 9B:
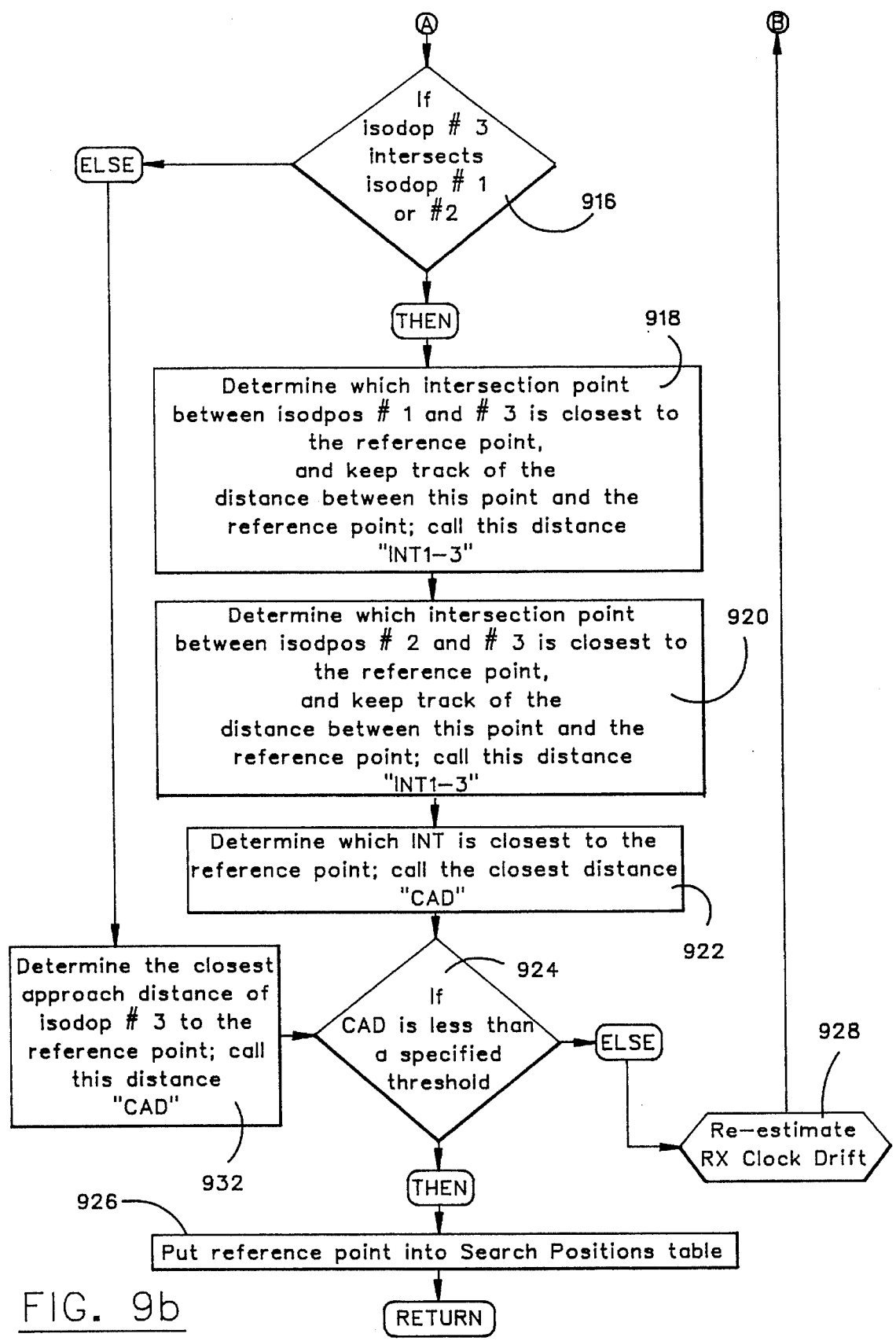

Referring to FIGS. 8, 9a and 9b, isodop positioning schemes for two and three acquired satellites are described. In the two-satellite algorithm of FIG. 8, similar to the one-satellite inquiry, the position, velocity and range rate data is input for the first and second satellites (step 800) and the isodop formula is executed for both satellites (steps 802 and 804). Based on the generated isodop lines, an isodop intersection is determined (step 806). If an intersection is found (step 808), the coordinates representing the intersection are mapped and/or input into the search positions table (step 810), and the position determination process may proceed in accordance with FIG. 6. However, if an intersection between the two isodop lines does not occur, the receiver clock drift is re-estimated (step 812). Consequently, a new set of range rate values is generated (step 814) and the isodop intersection determination is repeated. This process 1s continued until at least one intersection is found.

If, after two satellite isodop lines have been plotted and additional satellites searched, a third satellite is not acquired, the range rate is again adjusted to compensate for the lack of an accurate searching area (FIG. 6, step 616), and the search for new satellites Is continued. Eventually, when a third satellite is acquired (step 614), the three-satellite inquiry shown in FIGS. 9a and 9b is executed. Like the previous one and two-satellite schemes, the three satellites' positions, velocities, and range rates are considered in addition to the coordinates of the prior intersection point of the first two isodop lines (FIG. 9a, step 900), termed the reference point. The isodop equations for the first two satellites are then executed (steps 902 and 904) and any intersections determined (step 906). In step 908, a determination is made as to which, if any, intersection of the first two isodop lines is closest to the reference point. The isodop equations for the third satellite are executed (step 910) and the resultant isodop line is compared with those for the first two satellites to determine if the lines intersect (steps 912 and 914).

If at least one intersection is found (FIG. 9b, step 916), it must be determined which intersection point is closest to the reference point (steps 918, 920 and 922). In some embodiments, a predetermined threshold distance between the reference point and the closest intersection point may be specified. If the closest distance falls within the threshold (step 924), the corresponding isodop coordinates may be plotted and entered into the search positions table (step 926). However, if the threshold is not met, the clock drift is reevaluated and adjusted (step 928) to produce new range rate values for the three satellites (FIG. 9a, step 930). Accordingly, the isodop formulas are repeated. If, at step 916, the isodop line for the third satellite does not intersect the isodops of the first two satellites, the closest approach distance between the third isodop line and the reference point is determined (step 932) and compared with the threshold (step 924). The sequence of steps may then be resumed.

Thus, once the third satellite has been acquired, the initial position estimate may be determined according to the best intersection, as described above. If desired, a search for a fourth satellite may be performed to enable three-dimensional navigation, or two-dimensional navigation may be performed using altitude assistance.

Although a preferred embodiment of the invention has been described, it is to be understood that various changes, substitutions and alterations can be made without departing from the spirit and scope of the invention as defined by the appended claims.

What is claimed is:

1. A method of determining approximate coordinates of a particular geographical location on the earth, the method comprising the steps of:

receiving, at the particular geographical location on the earth, signals from first and second earth-orbiting satellites, the signals including information indicating the general location of the associated satellites with respect to an earth-centered, earth-fixed (ECEF) coordinate system;

measuring an actual rate of change of the range, relative to the particular geographical location, of each satellite as the satellite orbits the earth;

estimating a clock drift error;

calculating true rates of change of the ranges of the satellites based upon the measured actual rates of change of ranges and the estimated clock drift error; and calculating first and second pluralities of points representing first and second lines on the earth's surface along which the true rates of change of ranges of the first and second satellites, respectively, are constant.

2. The method of claim 1, further comprising the steps of:

determining whether the first and second lines intersect, wherein if no intersections are found, iteratively adjusting the estimated clock drift;

calculating revised true rates of change of the ranges, based upon the measured rate of change of range and the adjusted estimated clock drift error;

calculating revised first and second pluralities of points representing revised first and second lines on the earth's surface, wherein the particular geographical location on the earth is approximately located near the revised first and second lines; and repeating the above steps until at least one intersection between the iteratively revised first and second lines is obtained, wherein the at least one intersection is called the reference intersection.

3. The method of claim 2, further comprising the steps of:

receiving signals from one or more additional earth-orbiting satellites;

measuring actual rates of change of the ranges, relative to the particular geographical location on the earth, of the one or more additional satellites as they orbit the earth;

calculating true rates of change of the ranges of the one or more satellites, based upon the measured actual rates of change of ranges and the estimated clock drift error; and calculating one or more pluralities of points corresponding to one or more additional lines on the earth's surface along which the rates of change of the ranges of the one or more additional satellites are constant, wherein the particular geographical location on the earth is approximately located near the one or more additional lines and the reference intersection of the first and second lines.

4. The method of claim 3, further comprising the step of determining whether the first, second and one or more additional lines intersect, wherein if more than one intersection is obtained between the one or more additional lines and either the first or second lines, determining which intersection point is closest to the reference intersection, and calling this the closest intersection.

5. The method of claim 4, further comprising the steps of:

specifying a threshold distance from the reference intersection and the closest intersection; and determining whether the threshold distance is met, wherein if the distance from the reference intersection to the closest intersection is larger than the threshold distance, reestimating the clock drift error, recalculating the true rates of change of the ranges of the first, second, and one or more additional satellites relative to the particular geographical location on the earth, and recalculating first, second, and one or more additional pluralities of points representing revised first, second, and one or more additional lines on the earth's surface along which the true rates of change of the ranges of the first, second, and one or more additional satellites, respectively, are constant, determining a revised reference intersection representing at least one intersection between the revised first and second lines, determining whether the revised first, second and one or more additional lines intersect, wherein if more than one intersection is obtained between the one or more additional lines and either the first or second lines, determining which intersection point is closest to the revised reference intersection, and calling this the revised closest intersection, and determining whether the threshold distance is met, wherein if the distance from the revised reference intersection to the revised closest intersection is larger than the threshold distance, repeating the above steps, and further wherein if the distance from the revised intersection to the revised closest point is less than the threshold distance, determining that the particular geographical location on the earth is approximately located at the revised closest point.

6. The method of claim 1, wherein the satellite signals are received by a global positioning system receiver at the particular geographical location on the earth.

7. In a method for determining location coordinates of a particular geographical point on the earth, at least one earth-orbiting satellite is searched and tracked, each satellite transmitting radio frequency signals which indicate satellite position, velocity, and range rate relative to a predesignated coordinate system on the earth, the method comprising the steps of:

(A) if four or more satellites are tracked, calculating the coordinates of the particular geographical point corresponding to the coordinates of the four or more satellites;

(B) if less than four satellites are tracked, executing the following steps:

(1) if one satellite is tracked,
  (a) considering the satellite position, velocity, and range rate information,
  (b) determining an actual rate of change of the range of the satellite to the particular geographical point,
  (c) estimating a clock drift error,
  (d) calculating a true rate of change of the range of the satellite based upon the measured actual rate of change of range and the estimated clock drift error,
  (e) calculating a first plurality of points representing a first line on the earth's surface along which the true rate of change of range of the first satellite is constant, wherein the particular geographical point is approximately located near the first line, and
  (f) searching for additional satellites;

(2) if two satellites are tracked,
  (a) considering the position, velocity, and range rate information of the two satellites,
  (b) determining actual rates of change of the ranges of the satellites to the particular geographical point,
  (c) estimating a clock drift error,
  (d) calculating true rates of change of the ranges of the satellites based upon the measured actual rates of change of the ranges and the estimated clock drift error,
  (e) calculating first and second pluralities of points representing first and second lines on the earth's surface along which the true rates of change of ranges of the first and second satellites are constant, wherein the particular geographical point is approximately located near the first and second lines,
  (f) determining whether the first and second lines intersect, wherein if no intersections are found, iteratively adjusting the estimated clock drift,
  (g) calculating revised true rates of change of the ranges, based upon the measured rates of change of the ranges and the adjusted estimated clock drift error,
  (h) calculating revised first and second pluralities of points representing revised first and second lines on the earth's surface,
  (i) repeating the above steps until at least one intersection between the iteratively revised first and second lines is obtained, wherein the at least one intersection is called the reference intersection, and
  (j) searching for additional satellites;

(3) if three satellites are tracked,
  (a) considering the position, velocity, and range rate information of the three satellites,
  (b) determining actual rates of change of the ranges of the satellites to the particular geographical point,
  (c) estimating a clock drift error,
  (d) calculating true rates of change of the ranges of the satellites based upon the measured actual rates of change of the ranges and the estimated clock drift error,
  (e) calculating first, second, and third pluralities of points representing first, second and third lines on the earth's surface along which the true rates of change of ranges of the corresponding satellites are constant,
  (f) determining whether the first and second lines intersect, wherein if no intersections are found, iteratively adjusting the estimated clock drift, and calculating revised true rates of change of the ranges of the first and second satellites and calculating revised first and second pluralities of points representing revised first and second lines on the earth's surface until at least one intersection between the iteratively revised first and second lines is obtained, wherein the at least one intersection is called the reference intersection,
  (g) determining whether the third line intersects the first and second lines, wherein if more than one intersection is obtained between the third line and either the first or second lines, determining which intersection point is closest to the reference intersection, and calling this the closest intersection,
  (h) specifying a threshold distance from the reference intersection and the closest intersection, and
  (i) determining whether the threshold distance is met, wherein if the distance from the reference intersection to the closest intersection is larger than the threshold distance,
    i. reestimating the clock drift error,
    ii. recalculating the true rates of change of the ranges of the first, second, and third satellites relative to the particular geographical point, and
    iii. recalculating first, second, and third pluralities of points representing revised first, second, and one or more additional lines on the earth's surface along which the true rates of change of the ranges of the first, second, and one or more additional satellites, respectively, are constant,
    iv. determining a revised reference intersection representing at least one intersection between the revised first and second lines,
    v. determining whether the revised first, second, and third lines intersect, wherein if more than one intersection is obtained between the third line and either the first or second lines, determining which intersection point is closest to the revised reference intersection, and calling this the revised closest intersection, and
    vi. determining whether the threshold distance is met, wherein if the distance from the revised reference intersection to the revised closest intersection is larger than the threshold distance, repeating the above steps, and further wherein if the distance from the revised intersection to the revised closest point is less than the threshold distance, determining that the particular geographical point is approximately located at the revised closest point, and
  (j) searching for additional satellites and repeating steps (3)(a)–(i) until corresponding intersections have been determined, wherein the intersection of the maximum number of satellite lines is approximately at the position of the particular geographical point.

8. An apparatus for establishing an initial position on the earth of a global positioning system (GPS) in which signals from earth-orbiting satellites are detected, the signals including satellite position and velocity data, the apparatus comprising:

a receiver for receiving signals from a plurality of satellites, the receiver including a clock having an estimated clock bias error;

means for measuring an actual range from each satellite to the initial position according to the satellite position and velocity data;

means for calculating a rate of change of the range of each satellite, relative to the initial position and the estimated clock bias error; and means for generating a plurality of points representing a plurality of lines on the earth's surface, each line corresponding to one of the satellites, along which the rate of change of range of each satellite is constant, wherein if signals from at least four satellites are detected, the position of the initial location may be determined from the satellite data, or if signals from less than four satellites are detected, the intersections of the plurality of lines indicates the general position of the initial location.

9. The apparatus of claim 8, wherein if signals from two satellites are detected, their respective rates of change of ranges and corresponding lines on the earth's surface are determined, and if the two lines intersect, the intersection is called the reference intersection.

10. The apparatus of claim 9, further comprising means for searching for and detecting additional satellite signals, wherein if signals for a third satellite are detected, its rate of change of range and corresponding line on the earth's surface is determined and compared with the lines corresponding to those of the first two satellites, further wherein if one or more intersections of the third line with the first or second lines is found, the intersection closest to the reference intersection is determined and is deemed to be the approximate location of the initial position.

11. The apparatus of claim 10, wherein if no intersections between the third line and the first and second lines occur, the clock bias error is iteratively reestimated and new lines corresponding to the first, second and third satellites generated until at least one intersection of the third line with one of the first two lines occurs, further wherein any intersections between the first and second lines is called a revised reference intersection, such that the intersection of the third line with one of the first two lines closest to the reference intersection is deemed to be the approximate location of the initial position.

12. The apparatus of claim 11, wherein the clock bias error is reestimated and the first, second and third lines regenerated until the distance between the revised reference intersection and the intersection of the third line with the first two lines falls within a specified threshold distance.

13. The apparatus of claim 10, wherein signals from a fourth satellite are detected.

14. A method of determining approximate coordinates of a particular geographical location on the earth, the method comprising the steps of:

receiving, at the particular geographical location on the earth, signals from first and second earth-orbiting satellites, the signals including information indicating the general location of the associated satellites with respect to an earth-centered, earth-fixed (ECEF) coordinate system;

measuring an actual rate of change of the range, relative to the particular geographical location, of each satellite as the satellite orbits the earth;

estimating a clock drift error;

calculating true rates of change of the ranges of the satellites based upon the measured actual rates of change of ranges and the estimated clock drift error;

calculating first and second pluralities of points representing first and second lines on the earth's surface along which the true rates of change of ranges of the first and second satellites, respectively, are constant;

determining whether the first and second lines intersect, wherein if no intersections are found, iteratively adjusting the estimated clock drift;

calculating revised true rates of change of the ranges, based upon the measured rate of change of range and the adjusted estimated clock drift error;

calculating revised first and second pluralities of points representing revised first and second lines on the earth's surface, wherein the particular geographical location on the earth is approximately located near the revised first and second lines; and repeating the above steps until at least one intersection between the iteratively revised first and second lines is obtained, wherein the at least one intersection is called the reference intersection.

15. The method of claim 14, further comprising the steps of:

receiving signals from one or more additional earth-orbiting satellites;

measuring actual rates of change of the ranges, relative to the particular geographical location on the earth, of the one or more additional satellites as they orbit the earth;

calculating true rates of change of the ranges of the one or more satellites, based upon the measured actual rates of change of ranges and the estimated clock drift error; and calculating one or more pluralities of points corresponding to one or more additional lines on the earth's surface along which the rates of change of the ranges of the one or more additional satellites are constant, wherein the particular geographical location on the earth is approximately located near the one or more additional lines and the reference intersection of the first and second lines.

16. The method of claim 15, further comprising the step of determining whether the first, second and one or more additional lines intersect, wherein if more than one intersection is obtained between the one or more additional lines and either the first or second lines, determining which intersection point is closest to the reference intersection, and calling this the closest intersection.

17. The method of claim 16, further comprising the steps of:

specifying a threshold distance from the reference intersection and the closest intersection; and determining whether the threshold distance is met, wherein if the distance from the reference intersection to the closest intersection is larger than the threshold distance, reestimating the clock drift error, recalculating the true rates of change of the ranges of the first, second, and one or more additional satellites relative to the particular geographical location on the earth, and recalculating first, second, and one or more additional pluralities of points representing revised first, second, and one or more additional lines on the earth's surface along which the true rates of change of the ranges of the first, second, and one or more additional satellites, respectively, are constant, determining a revised reference intersection representing at least one intersection between the revised first and second lines, determining whether the revised first, second and one or more additional lines intersect, wherein if more than one intersection is obtained between the one or more additional lines and either the first or second lines, determining which intersection point is closest to the revised reference intersection, and calling this the revised closest intersection, and determining whether the threshold distance is met, wherein if the distance from the revised reference intersection to the revised closest intersection is larger than the threshold distance, repeating the above steps, and further wherein if the distance from the revised intersection to the revised closest point is less than the threshold distance, determining that the particular geographical location on the earth is approximately located at the revised closest point.

* * * * *